(No Model.)
F. W. WIESEBROCK.
APPARATUS FOR TREATING LIQUIDS.
No. 455,893. Patented July 14, 1891.
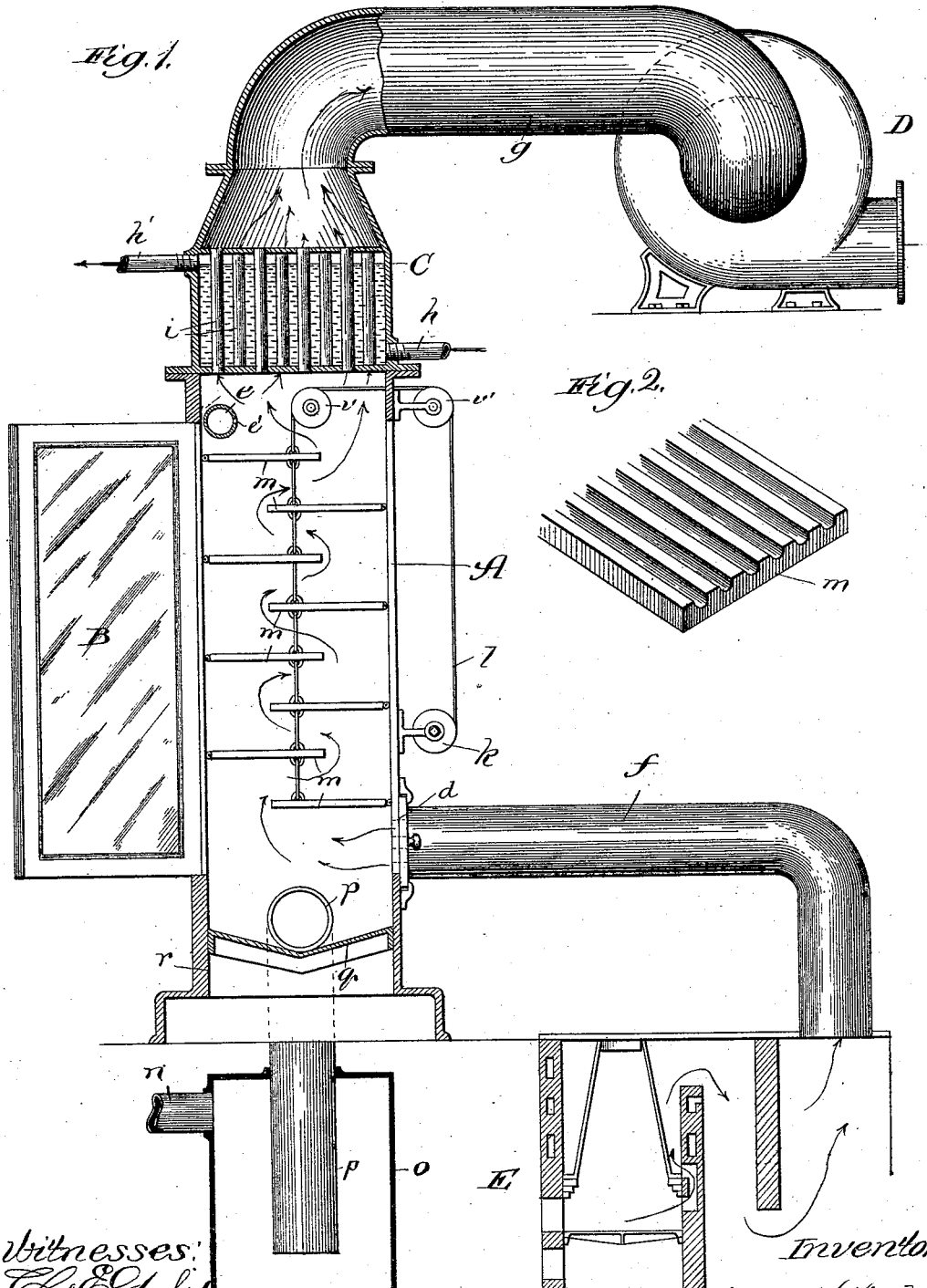

UNITED STATES PATENT OFFICE.

FREDERICK W. WIESEBROCK, OF CHICAGO, ILLINOIS.

APPARATUS FOR TREATING LIQUIDS.

SPECIFICATION forming part of Letters Patent No. 455,893, dated July 14, 1891.

Application filed March 14, 1891. Serial No. 385,105. (No model.)

*To all whom it may concern:*

Be it known that I, FREDERICK W. WIESE-BROCK, a citizen of the United States, residing at Chicago, in the county of Cook and State of Illinois, have invented a new and useful Improvement in Apparatus for Treating Liquids, of which the following is a specification.

The object of my improvement is to provide simple and effective means for treating liquids with currents of air and other gaseous fluids for cooling or heating the liquid, oxidizing, concentrating, drying, or saturating it, or for any other purpose requiring intimate contact with the liquid for its treatment of such gaseous fluid. Thus, as is well known, wort, in the manufacture of beer, or mash, in the manufacture of distilled liquors or beer, undergoes a more uniform and better fermentation if it has been intimately exposed to atmospheric air, because thereby the yeast growth is promoted.

My apparatus is designed for use in thus oxygenating the wort and mash, as also for other purposes, including the vaporization of brine to obtain the salt, the elimination of water from oils in the manufacture of the latter, oxidizing the impurities in sewage, thereby to prevent it from polluting the rivers or other bodies of water into which it is discharged, saturating, in the manufacture of sugar, and especially beet-sugar, the juice with carbonic-acid gas for effecting thorough precipitation of the alkalies and other foreign matter, and coagulating or solidifying matter in solution, as offal and refuse matter. The nature of the gaseous fluid to be employed depends, of course, on the nature of the result to be obtained.

For the sake of convenience I confine the description hereinafter contained to the use of my improved apparatus with air, and the apparatus is illustrated in the accompanying drawings, in which—

Figure 1 presents it by a view in broken sectional elevation, and Fig. 2 is an enlarged broken perspective view of a detail.

A is an upright tank on a suitable base $r$, containing a synclinal bottom $q$, near which is the discharge-pipe $p$, leading into a receiver $o$, nearly to the bottom of the latter, as indicated by dotted lines, the receiver having an overflow-spout $n$. Within the tank A, at each of two opposite sides thereof, is a vertical series of shelves $m$, hinged to the walls of the tank, with the interior cross-sectional contour of which they should correspond at least approximately. The members of the respective series of the hinged shelves alternate with and overlap each other, as represented, and each shelf is grooved, ribbed, or channeled lengthwise—that is, in the direction toward the center of the tank, where or about where they are all connected together, as by means of a chain $l$, passing over guide-pulleys $v\ v'$ outside the tank to a suitable windlass device $k$. If desired, to permit inspection of the interior of the tank during the operation therein, the door B (represented, the better to illustrate it, as open) or doors, if one be provided at each of two sides of the tank, may be glass-paneled.

The tank A is surmounted by a condenser C, which may be of usual or any suitable construction, and which is shown as being formed with pipes $i$, open at opposite ends in a chamber, into the base of which leads a water-inlet pipe $h$, and from the upper end of which leads the outlet-pipe $h'$, and D is a suction-fan communicating with the tank A through a conduit $g$, connected with the crown of the condenser.

E is a suitable air-heater communicating through a conduit $f$ with the tank A below the lowermost shelf $m$ therein. The liquid to be acted on in the apparatus, and which, for the sake of illustration, may be considered beer-wort, is introduced into the upper end of the tank by way of a pipe $e$, which should be perforated longitudinally, as indicated at $e'$, and extend across the upper end of the tank, the shelves $m$ being preparatively adjusted through the medium of the chain $l$ to the desired upward or downward inclination, or to extend horizontally, according to the requirement of retarding or facilitating the flow of the liquid from one shelf to the other, and the fan is actuated to draw the air through the liquid as it flows from shelf to shelf. If the liquid be sufficiently valuable and the only desired treatment be oxygenation thereof, the condenser C (which may be otherwise inactive) is operated by passing the cooling-water through it to condense the moisture carried by the air on its way through it and precipitate it back into the tank.

To regulate the admission of air into the tank, I provide a suitable register at the mouth of the conduit $f$, as indicated at $d$ in Fig. 1. The shelves $m$ being grooved in the direction of the flow, the liquid flows in small streams toward their discharge ends, where, in passing over from one shelf to the next, it encounters the upward-moving blast of air, and is thereby dashed against the wall of the tank, whence it flows down to the next shelf, having parted with a portion of its heat to the cooling-air. Thus the liquid is successively acted on as it passes downward to the successive shelves till it reaches the outlet $p$, by which it enters the receiver $q$ at a greatly-reduced temperature and is properly oxygenated. Thus, obviously, the cooling is effected and fermentation of the wort accordingly facilitated at a great saving of ice or its equivalent.

From the foregoing description of the treatment of wort by my improved apparatus the treatment of other liquids will be understood without further description, bearing in mind that the nature of the result desired determines that of the gaseous fluid to be employed and whether or not the heater E be brought into requisition for heating the fluid preparatory to its introduction into the apparatus.

It will also be apparent that my improved apparatus will serve as a means for effecting the absorption by water of noxious gases to get rid of the latter, which does not, as the title hereof suggests, relate to the treatment of a liquid with gas, but to the treatment of a gas with liquid.

What I claim as new, and desire to secure by Letters Patent, is—

1. In an apparatus for treating liquids, the combination of a tank A, containing vertical series of hinged and successively overlapping grooved shelves $m$, alternating with each other in the respective series and connected together to permit their simultaneous adjustment, an inlet near the base of the tank for the gaseous fluid, a liquid-supply inlet near the upper end thereof, and a suction-fan D, communicating with the upper portion of the tank, substantially as and for the purpose set forth.

2. In an apparatus for treating liquids, the combination of a tank A, containing vertical series of hinged and successively overlapping grooved shelves $m$, alternating with each other in the respective series and connected together to permit their simultaneous adjustment, an inlet $d$ near the base of the tank for the gaseous fluid, a liquid-supply inlet $e$ near the upper end and an outlet $p$ near the lower end of the tank, a receiver $o$, into which the outlet $p$ leads and having an overflow-spout $n$, and a suction-fan D, communicating with the upper portion of the tank, substantially as and for the purpose set forth.

3. An apparatus for treating liquids, comprising, in combination, a tank A, having a synclinal bottom and one or more doors and containing a vertical series of hinged and successively overlapping grooved shelves $m$, alternating with each other in the respective series and connected together by a chain $l$, controlled from without the tank, a heater E, communicating, controllably, with the lower portion of the tank, an outlet $p$, leading from the base of the tank into a receiver $o$, having an overflow $n$, a liquid-supply pipe $e$, leading into the upper portion of the tank, a condenser C, surmounting the tank, and a fan D, connected with the condenser, the whole being constructed and arranged to operate substantially as described.

FREDERICK W. WIESEBROCK.

In presence of—
W. H. DYRENFORTH,
M. J. FROST.